(12) United States Patent
Neriishi et al.

(10) Patent No.: US 7,141,805 B2
(45) Date of Patent: Nov. 28, 2006

(54) RADIATION IMAGE STORAGE PANEL

(75) Inventors: Keiko Neriishi, Kanagawa (JP); Kiyoteru Miyake, Kanagawa (JP); Yasuo Iwabuchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 221 days.

(21) Appl. No.: 10/751,456

(22) Filed: Jan. 6, 2004

(65) Prior Publication Data

US 2004/0188632 A1 Sep. 30, 2004

(30) Foreign Application Priority Data

Jan. 6, 2003 (JP) .............................. 2003-000387

(51) Int. Cl.
*H05B 33/00* (2006.01)

(52) U.S. Cl. .................................................. 250/484.4

(58) Field of Classification Search ............. 250/484.1, 250/484.4
See application file for complete search history.

(56) References Cited

U.S. PATENT DOCUMENTS

| 6,815,092 B1 * | 11/2004 | Van den Bergh et al. ... 428/690 |
| 6,967,339 B1 * | 11/2005 | Leblans et al. .......... 250/484.4 |
| 2003/0207331 A1 * | 11/2003 | Wilson et al. ................ 435/7.1 |

* cited by examiner

*Primary Examiner*—David Porta
*Assistant Examiner*—Djura Malevic
(74) *Attorney, Agent, or Firm*—Sughrue Mion, PLLC

(57) ABSTRACT

In a radiation image storage panel having a phosphor layer which is produced by gas phase deposition and composed of prismatic phosphors, the phosphor layer has a relative density higher or same on a lower side than or as on a upper side, and the prismatic phosphors have a diameter which is larger on a upper side than on a lower side.

7 Claims, 5 Drawing Sheets

Lower

Upper

Lower

Upper

RADIATION IMAGE STORAGE PANEL

FIELD OF THE INVENTION

The invention relates to a radiation image storage panel favorably employable in a radiation image recording and reproducing method utilizing stimulated emission of a stimulable phosphor.

BACKGROUND OF THE INVENTION

When the stimulable phosphor is exposed to radiation such as X-rays, it absorbs and stores a portion of the radiation energy. The stimulable phosphor then emits stimulated emission according to the level of the stored energy when the phosphor is exposed to electromagnetic wave such as visible light or infrared rays (i.e, stimulating light).

A radiation image recording and reproducing method utilizing the stimulable phosphor has been widely employed in practice. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating light to emit stimulated light; and photo-electrically detecting the emitted light to obtain electric signals giving a visible radiation image. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as stimulable phosphor sheet) has a basic structure comprising a substrate (i.e., support) and a stimulable phosphor layer provided thereon. However, if the stimulable phosphor layer is self-supporting, no substrate may be attached. The phosphor layer generally has a protective layer on its upper surface (surface not facing the substrate) to keep the phosphor layer from chemical denaturation and physical damage.

There are known a number of stimulable phosphor layers. A representative phosphor layer is formed by coating a dispersion of phosphor particles in a binder solution on the substrate and drying the coated dispersion on the substrate, and therefore comprises a binder and phosphor particles dispersed therein. Also known is a stimulable phosphor layer formed by vapor deposition and comprises prismatic phosphors in which a polymer binder is placed.

It is desired that radiation image storage panels have sensitivity as high as possible and further can give a reproduced radiation image of high quality (in regard of sharpness and graininess).

It is known that a radiation image storage panel have on a substrate a stimulable phosphor layer prepared by gas phase deposition such as vapor deposition or sputtering has a stimulable phosphor layer comprising multiple prismatic (or pillar-shaped) stimulable phosphor crystals standing on the substrate, and gives a reproduced radiation image with high sensitivity as well as high sharpness. This is because that the stimulable phosphor layer comprising multiple prismatic stimulable phosphor crystals has cracks between the adjoining prismatic phosphor crystals which favorably serve to efficiently receive a stimulating light and to efficiently release an emitted light and further serve to keep the stimulating light from scattering in a plane direction on the radiation image storage panel.

JP-A-2001-255610 describes a radiation image storage panel having a phosphor layer which is produced by gas phase deposition in which the phosphor layer has a thickness of 300 to 700 μm and a relative density (a ratio of the volume of the phosphor per the whole volume of the phosphor layer) in the range of 0.85 to 0.97.

JP-B-3070940 describes a method for depositing a stimulable phosphor layer on a substrate by decreasing a temperature of the substrate. It is stated that the method enables to produce a phosphor layer comprising prismatic phosphor crystals in which the prismatic phosphor crystals have no thick diameter even in the case that the thickness of the phosphor layer increases and the cracks are produced in the whole length in the depth direction. The resulting radiation image storage panel is stated to have an increased sharpness.

It is known that the phosphor layer in the radiation image storage panel which is produced by gas phase deposition should have a well-shaped prismatic structure extending in the depth direction to provide the phosphor layer with appropriate cracks, if a radiation image storage panel capable of providing a reproduced radiation image with a high sharpness is manufactured. If the volume of cracks is not enough, the reflection and scattering of the stimulating light as well as the emitted light decrease and the sharpness of the reproduced radiation image lowers. Particularly, in the case that the reproduction of the radiation image is carried out by line-detection, the sharpness of the reproduced image extremely lowers because of spreading of the emitted light. On the other hand, the phosphor layer should have a relative density as high as possible when it is desired to impart a higher sensitivity to a radiation image storage panel.

Nevertheless, a radiation image storage panel having a well balanced relationship between the image quality (such as sharpness) and the sensitivity is required particularly in the field of art of clinical test.

SUMMARY OF THE INVENTION

Accordingly, it is an object of the invention to provide a radiation image storage panel showing not only high sensitivity but also giving a reproduced radiation image of high quality.

The present inventors have discovered that the diameter of the prismatic phosphor and the relative density of the phosphor layer can be varied in the depth direction by controlling the gas phase deposition conditions such as the degree of vacuum and the temperature of a substrate on which the phosphor is deposited. The inventors further have discovered that if the phosphor layer in a radiation image storage panel has a relative density higher or same on a lower side than or as on a upper side, and the prismatic phosphors have a diameter which is larger on a upper side than on a lower side, that is, if the diameter of the cracks are relatively wide on the upper side and relatively narrow on the lower side, the spreading of the stimulating light and emitted light on the plane of the phosphor layer on the upper side (on which the emitted light is detected) is reduced to give a reproduced radiation image with a high sharpness, and the stimulating light is well absorbed by the phosphor layer particularly on the lower side.

The present invention has complete based on the above-mentioned discovery.

The present invention resides in a radiation image storage panel comprising a phosphor layer which is produced by gas phase deposition and composed of prismatic phosphors, wherein the phosphor layer has a relative density higher or same on a lower side than or as on a upper side, and the prismatic phosphors have a diameter which is larger on a upper side than on a lower side.

In the invention, the diameter of the prismatic phosphor is used to mean an average of diameters of prismatic phosphor which are observed on a section extending in parallel to the surface of the phosphor layer (vertically to the depth direction of the phosphor layer). The diameter is measured by the use of a scanning electron microscope. The lower side of the phosphor layer is a side from which the prismatic phosphor crystals grow and a side to which a substrate (or support) is generally attached. The diameter of prismatic phosphor on the lower side means an average diameter observed at the height of 1/5 of the thickness of the phosphor layer from the lower side (i.e., bottom surface). The upper side of the phosphor layer is a side at which the growth of the prismatic phosphor crystals ends. The emitted light is generally detected on the upper side. The diameter of prismatic phosphor on the upper side means an average diameter observed at the depth of 1/5 of the thickness of the phosphor layer from the upper side (i.e., top surface).

The relative density of the phosphor layer corresponds to a ratio of areas of prismatic phosphor against the whole area of the phosphor layer which are observed on a section extending in parallel to the surface of the phosphor layer (vertically to the depth direction of the phosphor layer). The areas are measured by the use of a scanning electron microscope. The relative density of prismatic phosphor on the lower side means an average relative density observed at the height of 1/5 of the thickness of the phosphor layer from the lower side (i.e., bottom surface). The relative density of prismatic phosphor on the upper side means an average relative density observed at the depth of 1/5 of the thickness of the phosphor layer from the upper side (i.e., top surface).

Preferred embodiments of the radiation image storage panel of the invention are described below:

(1) The relative density of the phosphor layer decreases from the lower side to the upper side, while the diameter of the prismatic phosphors increases from the lower side to the upper side.

(2) The prismatic phosphors have a mean diameter in the range of 0.1 to 50 μm on both of the upper side and lower side.

(3) The relative density of the phosphor layer is in the range of 0.75 to 0.96 on both of the upper side and lower side.

(4) The radiation image storage panel further comprises a substrate on the lower side.

(5) The phosphor is a stimulable phosphor, particularly is an alkali metal halide phosphor having the formula (I):

$$M^I X \cdot a M^{II} X'_2 \cdot b M^{III} X''_3 : zA \qquad (I)$$

in which $M^I$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Mg, Cu, and Bi; and a, b and z are numbers satisfying the conditions of $0 \leq a < 0.5$, $0 \leq b < 0.5$ and $0 < z < 1.0$, respectively.

(6) The stimulable phosphor is an europium activated cesium bromide phosphor.

DETAILED DESCRIPTION OF THE INVENTION

The radiation image storage panel of the invention is further described by referring to the attached drawings.

Figure 1:
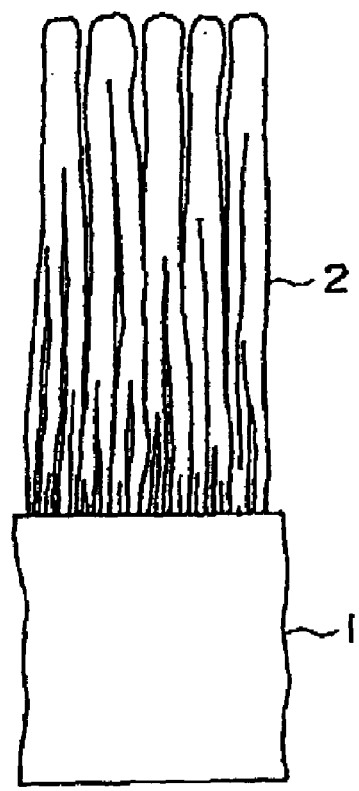
FIG. 1 shows a partial vertical section of a radiation image storage panel of the invention in which the prismatic phosphors are standing on a substrate.

FIG. 1 shows a partial vertical section of a radiation image storage panel of the invention in which the prismatic phosphors are standing on a substrate. In FIG. 1, the radiation image storage panel comprises a support (or substrate) 1 and a phosphor layer 2. The phosphor layer 2 comprises prismatic phosphors which are deposited on the substrate 1 by gas phase deposition. On the side of the substrate 1, the prismatic phosphors are relatively narrow phosphors, and the narrow prismatic phosphors are combined on a upper side to give relatively thick prismatic phosphors. The cracks (i.e., clearances) between the adjoining prismatic phosphors are narrow on the lower side and broad on the upper side.

Figure 2:
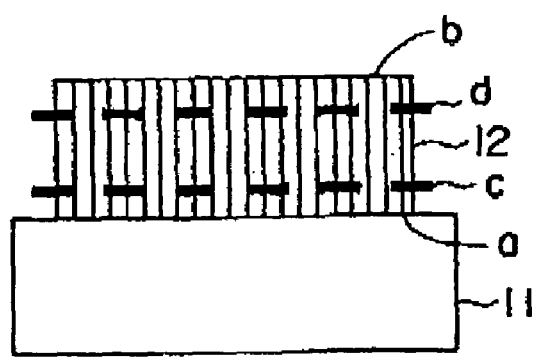
FIG. 2 schematically illustrate a structure of the radiation image storage panel in which the bottom surface (a), the top surface (b), the 1/5 height (c) on the lower side, and the 1/5 depth (d) on the upper side are identified.

FIG. 2 schematically illustrate a structure of the radiation image storage panel. The radiation image storage panel of FIG. 2 comprises a substrate 11 and a phosphor layer deposited by gas phase deposition. In FIG. 2, the bottom surface (a), the top surface (b), the 1/5 height (c) on the lower side, and the 1/5 depth (d) on the upper side are identified.

Figure 3:
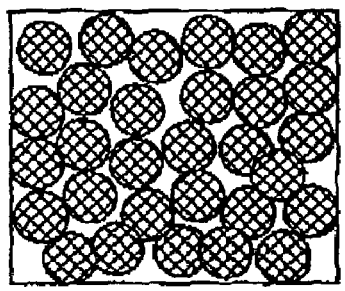
FIG. 3 illustrates a section of one phosphor layer at the 1/5 height (c) on the lower side (on the left side), and a section of the phosphor layer at the 1/5 depth (d) on the upper side (on the right side).
Figure 3:
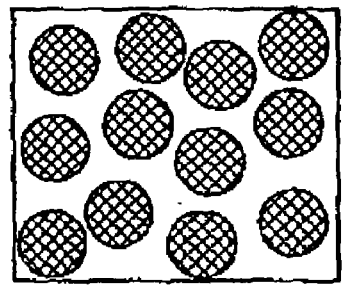

FIG. 3 schematically illustrates a view of a lateral section on the lower side (c) of the phosphor layer of FIG. 1 (on the left side), and a view of a lateral section on the upper side (d) of the phosphor of FIG. 1 (on the right side). The relationships of a mean diameter of the prismatic phosphor, a relative density of the phosphor layer, and a mean clearance width (i.e., mean crack width) between on the lower side and on the upper side are summarized below.

|  | On the lower side |  | On the upper side |
| --- | --- | --- | --- |
| Mean diameter of prismatic phosphor | small | < | large |
| Relative density | high | < | low |
| Clearance | narrow | < | broad |

Figure 4:
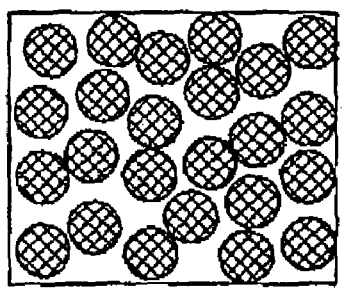
FIG. 4 illustrates a section of another phosphor layer at the 1/5 height (c) on the lower side (on the left side), and a section of the phosphor layer at the 1/5 depth (d) on the upper side (on the right side).
Figure 4:
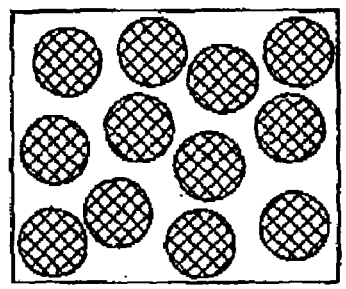

FIG. 4 schematically illustrates a view of a lateral section on the lower side (c) of another phosphor layer of the invention (on the left side), and a view of a lateral section on the upper side (d) of the phosphor of the invention (on the right side). The relationships of a mean diameter of the prismatic phosphor, a relative density of the phosphor layer, and a mean clearance width (ie., mean crack width) between on the lower side and on the upper side are summarized below.

|  | On the lower side |  | On the upper side |
| --- | --- | --- | --- |
| Mean diameter of prismatic phosphor | small | < | large |
| Relative density | appropriate | = | appropriate |
| Clearance | narrow | < | broad |

In the invention, the diameter of the prismatic phosphor and the relative density of the phosphor on the lower side are used to mean, respectively, a mean diameter and a relative phosphor material area observed at the ⅕ height (c in FIG. 2) of the thickness of the phosphor layer and a mean diameter and a relative phosphor material area observed at the ⅕ depth (d in FIG. 2) of the thickness of the phosphor layer. The diameter and relative density can be measured and calculated in the following manner.

The lateral sections of the phosphor layer are exposed by applying ion beams to the phosphor layer by Focusing Ion Beam (FIB) method or the like at the ⅕ depth or the ⅕ height. The exposed section containing approx. 100 sections of prismatic phosphor crystals is photographed by a scanning electron microscope (SEM). The area of the exposed sections of the prismatic phosphor crystals and the whole area are measured, and the average diameter of the prismatic phosphor crystals and the relative density (the area of average diameter/whole area) are calculated.

The phosphor layer of the radiation image storage panel of the invention has a relative density which is larger on the lower side than on the upper side, or the same on both of the lower side and upper side. The prismatic phosphor has a diameter larger on the upper side than on the lower side. By the specific structure, the phosphor layer has a large relative density and a small space between the adjoining prismatic phosphors and well absorbs a radiation such as X-rays. Further, since a stimulating light hardly passes through the phosphor layer without being absorbed by the phosphor, the phosphor layer shows a high sensitivity. On the other hand, the diameter of the prismatic phosphor is higher on the upper side than on the on the lower side, but the relative density is low on the upper side. Accordingly, the clearance (cracks) between the adjoining prismatic phosphors is large on the upper side. This structure gives to the phosphor layer a light-guide effect to keep the emitted light from spreading in the lateral direction and to guide the emitted light up to the upper surface of the phosphor layer. Accordingly, a radiation image of a high image quality is reproduced.

The diameter of the prismatic phosphor preferably increases gradually from the lower side to the upper side, while the relative density of the phosphor layer preferably decreases gradually from the lower side to the upper side. Therefore, the clearance between the adjoining prismatic phosphors preferably increases gradually from the lower side to the upper side.

The diameter (mean diameter) of the prismatic phosphors preferably is in the range of 0.1 to 50 μm both on the lower side and upper side. Specifically preferred are that the diameter of the prismatic phosphor on the lower side is in the range of 0.5 to 5 μm and the diameter on the upper side is in the range of 5 to 20 μm.

The relative density of the phosphor layer preferably is in the range of 0.75 to 0.96 both on the lower side and on the upper side. Specifically preferred is that the relative density on the lower side is in the range of 0.87 to 0.96 and the relative density on the upper side is in the range of 0.75 to 0.85.

The width of clearance (mean width) preferably is one thirds the wavelength of the emitted light on the upper side so that spreading of the emitted light is effectively reduced. The width of clearance preferably is in the range of 100 nm to 5 nm.

The radiation image storage panel of the invention is limited to the constitution illustrated in FIG. 1. The substrate may be omitted, and a protective layer and various auxiliary layers can be attached to the phosphor layer.

The method for manufacturing the radiation image storage panel of the invention is described below by referring to the case that the phosphor is a stimulable phosphor and the gas phase deposition is vapor deposition.

The support (i.e., substrate) preferably is a sheet of quartz glass, sapphire, metal (e.g., aluminum, iron, tin, or chromium) or heat-resistant resin (e.g., aramide resin). The support may have an embossed surface or a surface having concaves and/or convexes. On the substrate can be placed a light reflecting layer such as a layer containing a titanium dioxide or a light absorbing layer such as a layer containing carbon black.

The stimulable phosphor preferably emits a stimulated emission in the wavelength region of 300 to 500 nm upon simulation with a stimulating light having a wavelength region of 400 to 900 nm.

A preferred group of the stimulable phosphor is an alkali metal halide phosphor having the formula (I):

$$M^I X \cdot a M^{II} X'_2 \cdot b M^{III} X''_3 : zA \tag{I}$$

in which $M^I$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Mg, Cu, and Bi; and a, b and z are numbers satisfying the conditions of $0 \leq a < 0.5$, $0 \leq b < 0.5$ and $0 < z < 1.0$, respectively.

In the formula (I), $M^I$ preferably comprises Cs. X preferably comprises Br. A preferably is Eu or Bi. Accordingly, as the stimulable phosphor, CsBr:Eu (europium activated cesium bromide) is most preferred.

The stimulable phosphor of the formula (I) can contain a metal oxide such as al oxide, silicon dioxide, or zirconium oxide in an amount of 0.5 mol or lower based on one mol of $M^IX$.

In the case that the stimulable phosphor of the formula (I) contains an europium activator, the europium compound of the evaporation source preferably comprise a divalent europium ($Eu^{2+}$) compound and a trivalent ($Eu^{3+}$) compound. The europium compound preferably is $EuBr_x$ in which x preferably satisfies the condition of $2.0 \leq x \leq 2.3$. It is preferred that the europium compound contains the divalent europium compound as much as possible, at least 70%.

Another preferred stimulable phosphor is a rare earth activated alkaline earth metal fluoride-halide phosphor having the following formula (II):

$$M^{II}Fx:zLn \qquad (II)$$

in which $M^{II}$ is at least one alkaline earth metal element selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), Ba is preferably included in an amount of half or more of $M^{II}$, and Ln particularly preferably is Eu or Ce. The $M^{II}FX$ in the formula (II) indicates the crystal structure of BaFX, and it by no means indicates F:X=1:1. The formula (II), therefore, does not indicate resultant stoichiometric composition. It is generally preferred to produce many $F^+(X^-)$ centers (which are vacant lattice points of $X^-$ ion) in a BaFX crystal, so as to enhance the efficiency of emission stimulated by light in the wavelength region of 600 to 700 nm. In many cases, F is in slight excess of X.

For the preparation of the phosphor layer on a substrate, it is preferred to employ two or more evaporation sources such as a combination of an evaporation source (such as in the form of tablet) comprising a matrix component and an evaporation source (such as in the form of tablet) comprising an activator component.

In the evaporation procedure, an evaporation source or evaporation sources comprising a matrix component and an activator component independently or in combination and a substrate can be first set in a vacuum evaporation apparatus. The substrate is placed perpendicularly to the direction in which the vapor comes out of the source. The apparatus is then evacuated to give an inner pressure of $1 \times 10^{-5}$ to $1 \times 10^{-2}$ Pa for electron beam evaporation or 0.3 to 3 Pa (preferably 0.5 to 1.5 Pa) for resistance heating evaporation. An inert gas such as Ar gas or Ne gas is preferably incorporated into the apparatus.

In the vapor deposition procedure, one or more evaporation sources of stimulable phosphor material are set in the evaporation apparatus. The evaporation sources can be a combination of one or more evaporation sources of the matrix component and one or more evaporation sources of the activator component.

The evaporation source are then heated by applying an electron beam or heating with a resistance heating means, to form a prismatic stimulable phosphor crystal-line layer on the substrate. In the vapor deposition, the prismatic phosphor crystals deposit on the substrate to give well-shaped prismatic stimulable phosphor crystals.

In the electron beam evaporation, an electron beam generated by an electron gun is applied onto the evaporation source. The accelerating voltage of electron beam preferably is in the range of 1.5 kV to 5.0 kV. By applying the electron beam, the evaporation source of matrix component and activator element is heated, vaporized, and deposited on the substrate. In the resistance heating evaporation, the evaporation sources are heated by supplying electric energy to the resistance heating means. The deposition rate generally is in the range of 0.1 to 1,000 µm/min., preferably in the range of 1 to 100 µm/min. The substrate may be cooled or heated, if needed, during the deposition process.

After the procedure for forming the stimulable phosphor layer on the substrate is complete, the resulting layer can be subjected to heat treatment (annealing treatment).

The stimulable phosphor layer preferably has a thickness of 50 to 1,000 µm, more preferably 200 to 700 µm.

The formed phosphor layer comprises prismatic stimulable phosphor crystals which are aligned almost perpendicularly to the substrate. Thus formed phosphor layer comprises only the stimulable phosphor with no binder, and there are produced cracks extending in the depth direction in the phosphor layer.

As described above, the vacuum evaporation or deposition method is not restricted to the electron beam-evaporating method, and various known methods such as resistance-heating method, sputtering method, and CVD method can be used.

It is preferred to place a transparent protective film on the surface of the stimulable phosphor layer, so as to ensure good handling of the radiation image storage panel in transportation and to avoid deterioration. The protective film preferably is transparent. Further, for protecting the storage panel from chemical deterioration and physical damage, the protective film preferably is chemically stable, physically strong, and of high moisture proof.

The protective film can be provided by coating the stimulable phosphor film with a solution in which an organic polymer (e.g., cellulose derivatives, polymethyl methacrylate, fluororesins soluble in organic solvents) is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film generally is in the range of about 0.1 to 20 µm (if the film is made of polymer material) or in the range of about 100 to 1,000 µm (if the film is made of inorganic material such as silicate glass). For enhancing the resistance to stain, a fluororesin layer is preferably provided on the protective film. The fluororesin layer can be form by coating the surface of the protective film with a solution in which a fluororesin is dissolved or dispersed in an organic solvent, and drying the coated solution. The fluororesin may be used singly, but a mixture of the fluororesin and a film-forming resin can be employed. In the mixture, an oligomer having polysiloxane structure or perfluoroalkyl group can be further added. In the fluoro-resin layer, fine particle filler may be incorporated to reduce blotches caused by interference and to improve the quality of the resultant image. The thickness of the fluororesin layer is generally in the range of 0.5 to 20

μm. For forming the fluororesin layer, additives such as a crosslinking agent, a film-hardened agent and an anti-yellowing agent can be used. In particular, the crosslinking agent is advantageously employed to improve durability of the fluororesin layer.

Thus, a representative radiation image storage panel of the invention can be prepared. The storage panel of the invention may be in known various structures. For example, in order to improve the sharpness of the resultant image, at least one of the films may be colored with a colorant which does not absorb the stimulated emission but the stimulating rays.

The present invention is further described by the following examples.

EXAMPLE 1

(1) Evaporation Source

Powdery cesium bromide (CsBr, purity: 4N or higher) and powdery europium bromide ($EuBr_x$, x=approx. 2.2, purity: not lower than 3N) were employed as the starting materials. The analysis of each starting material by ICP-MS method (inductively coupled plasma spectroscopy-mass spectroscopy) revealed that each of alkali metals other than Cs (Li, Na, K, Rb) and each of alkaline earth metals (Mg, Ca, Sr, Ba) were present in the cesium bromide in amounts of less than 10 ppm and less than 2 ppm, respectively, and each of rare earth elements other than Eu and each of other elements were present in the europium bromide in amounts of less than 20 ppm and less than 10 ppm, respectively.

Since both starting materials were highly hygroscopic, they were stored in a desiccator under dry atmosphere showing a dew point of lower than −20° C., and taken out just before the following preparation was made.

(2) Formation of Phosphor Layer

A synthetic quartz substrate was washed successively with an aqueous alkaline solution, purified water, and isopropyl alcohol, and then mounted to a substrate holder within an evaporation apparatus. Each of the powdery CsBr and powdery $EuBr_x$ was placed in a crucible and was set on the predetermined site of the apparatus. Subsequently, the apparatus was evacuated using a combination of a rotary pump, mechanical booster, and turbo molecular pump to reach $1 \times 10^{-3}$ Pa. Subsequently, Ar gas was introduced into the apparatus until the inner pressure reached 0.8 Pa.

In the apparatus, the substrate was continuously heated to 100° C. by means of a sheath heater placed on the back side of the substrate.

Each of the powdery CsBr and powdery $EuBr_x$ was heated by resistance-heating means under the condition that the substrate was placed apart from the evaporation sources by 12 cm, to deposit a stimulable CsBr:Eu phosphor layer on the substrate. The deposition rate was 5 μm/min. The Eu/Cs atomic ratio was adjusted to become 0.003/1 by controlling the electric power supplied to each resistance-heating means. The start of the deposition of CsBr and the start of the deposition of $EuBr_x$ were controlled by controlling the timing of opening of the shutters placed between the evaporation sources and the substrate.

After the evaporation-deposition procedure was complete, the inner pressure was returned to atmospheric pressure, and the substrate was taken out of the apparatus. On the substrate, a stimulable phosphor layer (thickness: approx. 500 μm, area: 10 cm×10 cm) consisting of prismatic phosphor crystals aligned densely and perpendicularly were formed.

Thus, a radiation image storage panel of the invention comprising a substrate and a deposited stimulable phosphor layer was prepared.

EXAMPLE 2

The procedures of Example 1 were repeated except that the pressure in the apparatus at the start of the evaporation was adjusted to 1.2 Pa by incorporating Ar gas, and the pressure was gradually lowers to reach 0.1 Pa at the end of the evaporation, to prepare a radiation image storage panel of the invention comprising a substrate and a deposited stimulable phosphor layer.

EXAMPLE 3

The procedures of Example 1 were repeated except that the distance between the evaporation sources and the substrate was changed to 20 cm, and the substrate was heated to 80° C., to prepare a radiation image storage panel of the invention comprising a substrate and a deposited stimulable phosphor layer.

COMPARISON EXAMPLE 1

The procedures of Example 1 were repeated except that the evaporation apparatus was further evacuate to have a pressure of $8 \times 10^{-4}$ Pa, and the substrate was heated to 300° C., to prepare a radiation image storage panel for comparison comprising a substrate and a deposited stimulable phosphor layer.

COMPARISON EXAMPLE 2

The procedures of Example 1 were repeated except that the evaporation apparatus was further evacuate to have a pressure of $7 \times 10^{-2}$ Pa, to prepare a radiation image storage panel for comparison comprising a substrate and a deposited stimulable phosphor layer.

COMPARISON EXAMPLE 3

The procedures of Example 1 were repeated except that the pressure in the evaporation apparatus at the start of the evaporation was adjusted to 1.0 Pa by incorporating Ar gas, and the temperature of the substrate was gradually increased to 250° C. (at the end of the deposition), to prepare a radiation image storage panel for comparison comprising a substrate and a deposited stimulable phosphor layer.

Evaluation of Radiation Image Storage Panel

The resulting radiation image storage panels were evaluated in their sensitivity and sharpness of the reproduced radiation image, according to the below-mentioned procedures.

(1) Sensitivity

The radiation image storage panel was encased in a room light-shielding cassette and then exposed to X-rays (80 kVp, 100 mR). Subsequently, the storage panel was taken out of the cassette and scanned with LD laser beam (wavelength: 650 nm). The stimulated emission was detected by a photomultiplier to measure the luminance of stimulated emission emitted from each storage panel. The measured luminance is set forth in Table 1 in terms of a relative value. The relative value for an acceptable radiation image storage panel is 100 or more.

(2) Sharpness

The radiation image storage panel was encased in a room light-shielding cassette and then exposed to X-rays (80 kVp, 100 mR). Subsequently, the storage panel was taken out of the cassette and scanned with LD laser beam (wavelength: 650 nm, width of spot of the stimulating light: 100 μm). The stimulated emission was detected by a photomultiplier to measure the width of emitted light. The small width of the emitted light means a high sharpness.

Figure 5:
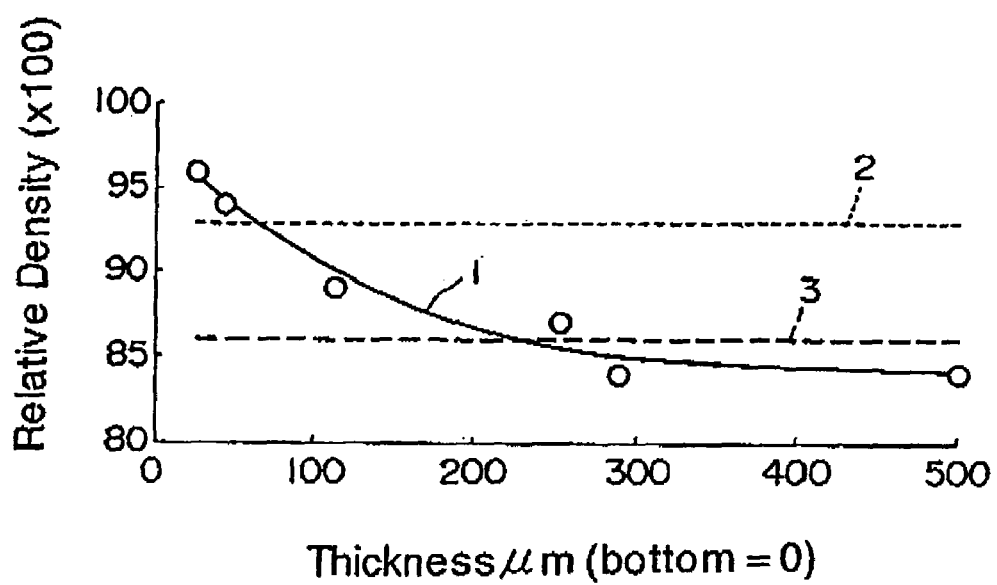
FIG. 5 is a graph indicating a relationship between a thickness and a relative density of a phosphor layer of a radiation image storage panel of the invention.
Figure 6:
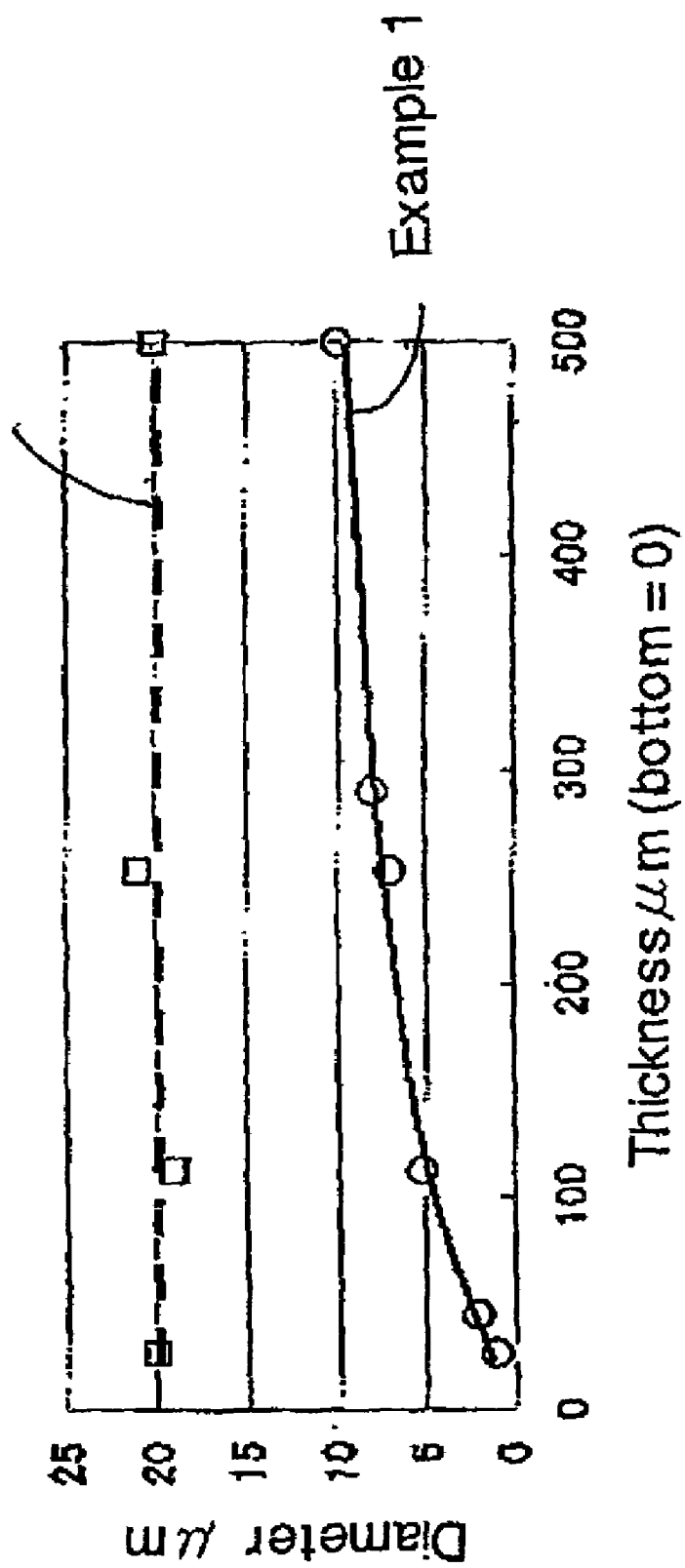
FIG. 6 is a graph indicating a variation of an average diameter (μm) along the thickness (μm) of a phosphor layer of a radiation image storage panels of Example 1 and Comparison Example 1.
Figure 7:
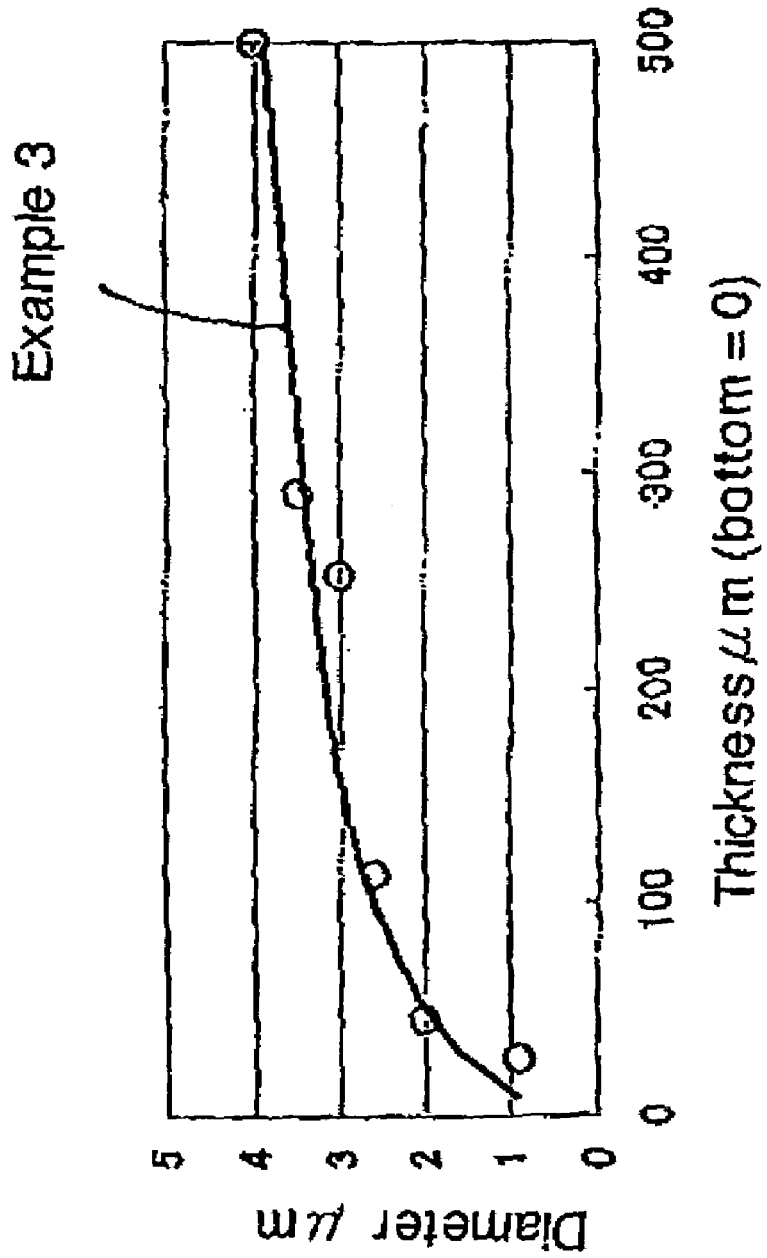
FIG. 7 is a graph indicating a variation of an average diameter (μm) along the thickness (μm) of a phosphor layer of a radiation image storage panel of Example 3.

The results are set forth in Table 1 and graphically illustrated in FIGS. 5 to 7.

TABLE 1

| Example | Pressure (Pa) | Temp. (° C.) substrate | Diameter μm (L/U) | R.D. (%) (L/U) | Sensitivity sharpness |
|---|---|---|---|---|---|
| Example 1 | 0.8 | 100 | 1/10 | 96/84 | 100/290 |
| Example 2 | 1.2–0.1 | 100 | 1/10 | 90/90 | 110/380 |
| Example 3 | 0.8 | 80 | 0.9/4 | 96/84 | 96/270 |
| Com. Ex. 1 | 0.0008 | 300 | 20/20 | 93/93 | 30/1300 |
| Com. Ex. 2 | 0.07 | 100 | 5/5 | 86/86 | 15/410 |
| Com. Ex. 3 | 1.0 | 100–250 | 1/10 | 86/93 | 90/800 |

Remarks:
Pressure: Pressure in the evaporation apparatus
Tem. (° C.) Temperature of the substrate
Diameter μm(L/U): Mean diameter of prismatic phosphor crystals (lower side/upper side)
R.D. (%) (L/U): Relative density (%) (lower side/upper side)
Sensitivity: Relative sensitivity
Sharpness: Sharpness in terms of width (μm) of spot of the emitted light FIG. 5 indicates a relationship between a thickness and a relative density (×100) of a phosphor layer of a radiation image storage panel of the invention. In FIG. 5, the solid line 1 is for the radiation image storage panel of Example 1 according to the invention, the broken lines 2 and 3 are, respectively, for the radiation image storage panels of Comparison Examples 1 and 2.

FIG. 6 indicates a variation of an average diameter (μm) along the thickness (μm) for each of the phosphor layers of the radiation image storage panels of Example 1 and Comparison Example 1.

FIG. 7 indicates a variation of an average diameter (μm) along the thickness (μm) of a phosphor layer of a radiation image storage panel of Example 3.

As is apparent from the data set forth in Table 1 and illustrated in FIG. 5, the radiation image storage panels of the invention (Examples 1 to 3) in which a relative density is lower on the upper side than on the lower side, and the prismatic phosphors have a diameter which is larger on a upper side than on a lower side shows satisfactory sensitivity and satisfactory sharpness. Thus, the radiation image storage panel of the invention has a well balanced sensitivity and sharpness.

In contrast, the radiation image storage panel for comparison (Comparison Example 1) which has a high relative density both on the lower side and upper side and has an equally extended diameter from the lower end to the upper end has an extremely unsatisfactory sharpness, while it has a satisfactorily high sensitivity.

The radiation image storage panel for comparison (Comparison Example 2) which has a low relative density both on the lower side and upper side and has an equally extended diameter from the lower end to the upper end has a unsatisfactory sensitivity sharpness.

The radiation image storage panels for comparison (Com. Ex. 3) in which a relative density is larger on the upper side than on the lower side and the prismatic phosphors have a diameter which is larger on a upper side than on a lower side shows unsatisfactory sensitivity and unsatisfactory sharpness.

What is claimed is:

1. A radiation image storage panel comprising a substrate and a phosphor layer which is produced on the substrate by gas phase deposition and composed of prismatic phosphors, wherein the phosphor layer has a relative density higher or the same on a lower side closer to the substrate than or as on an upper side farther from the substrate, and the prismatic phosphors have a diameter which is larger on the upper side than on the lower side.

2. The radiation image storage panel of claim 1, wherein the relative density of the phosphor layer decreases from the lower side to the upper side, while the diameter of the prismatic phosphors increases from the lower side to the upper side.

3. The radiation image storage panel of claim 1, wherein the prismatic phosphors have a mean diameter in the range of 0.1 to 50 μm on both of the upper side and lower side.

4. The radiation image storage panel of claim 1, wherein the relative density of the phosphor layer is in the range of 0.75 to 0.96 on both of the upper side and lower side.

5. The radiation image storage panel of claim 1, wherein the phosphor is a stimulable phosphor.

6. The radiation image storage panel of claim 5, wherein the stimulable phosphor is an alkali metal halide phosphor having the formula (I):

$$M^{I}X \cdot aM^{II}X'_2 \cdot bM^{III}X''_3 : zA \qquad (I)$$

in which $M^{I}$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Mg, Cu, and Bi; and a, b and z are numbers satisfying the conditions of $0 \leq a < 0.5$, $0 \leq b < 0.5$ and $0 < z < 1.0$, respectively.

7. The radiation image storage panel of claim 6, wherein the stimulable phosphor is europium activated cesium bromide phosphor.

* * * * *